United States Patent [19]

Bafaro et al.

[11] Patent Number: 4,675,740
[45] Date of Patent: Jun. 23, 1987

[54] DIRECT DRIVE SCANNING CRT DISPLAY SYSTEM

[75] Inventors: Michael P. Bafaro, Schaumburg; Theodore V. Lester, Schiller Park, both of Ill.

[73] Assignee: Motorola, Inc., Schaumburg, Ill.

[21] Appl. No.: 722,873

[22] Filed: Apr. 12, 1985

[51] Int. Cl.⁴ .............................................. H04N 3/18
[52] U.S. Cl. ................................... 358/243; 358/220; 315/364; 315/411
[58] Field of Search ................. 358/243, 242, 190, 74, 358/220; 315/364, 370, 395, 411, 387, 399, 408, 409

[56] References Cited

U.S. PATENT DOCUMENTS 4,412,157 10/1983 Gamboa ............................... 315/387
4,546,388 10/1985 Williams ............................... 358/243
4,562,508 12/1985 Chen ..................................... 358/243

Primary Examiner—Tommy P. Chin
Attorney, Agent, or Firm—Phillip H. Melamed

[57] ABSTRACT

A scanning CRT display system is disclosed in which transitions of a horizontal sync signal are directly utilized to provide control signals for driving a FET (field effect transistor) power drive device which controls horizontal deflection yoke current. Protection circuitry is provided such that the FET power drive device is turned off if excessive FET through current is sensed, and protection circuitry also prevents turning on the FET drive device if an excessively high flyback voltage is present at the drain terminal of the FET device. Linearization of the horizontal deflection yoke current is provided by effectively sensing the temperature variable on resistance of the FET output drive device and providing a compensation control signal in accordance therewith, wherein this compensation control signal controls the magnetization provided by a control winding on a saturable magnetic core on which a linearity compensation coil is also wound. The linearity compensation coil and the deflection yoke are connected in series and the compensation control signal effectively reduces the series inductance of these elements so as to provide linearity compensation for horizontal deflection yoke current.

8 Claims, 4 Drawing Figures

DIRECT DRIVE SCANNING CRT DISPLAY SYSTEM

BACKGROUND OF THE INVENTION

The present invention is related to a direct drive scanning CRT (cathode ray tube) display system. More specifically, the present invention is related to protection circuitry for such a system which prevents the output drive device, which controls yoke current, from drawing excessive current.

In known scanning CRT display systems the turning on and off of an output drive device which controls horizontal deflection yoke current is accomplished in accordance with a horizontal sync (synchronization) input signal. During a trace cycle, an electron beam is horizontally swept across a CRT surface in accordance with defection yoke current to define one horizontal line of a visual picture, and during a retrace cycle the beam is repositioned. If the horizontal sync input signal is lost, or if some transitions in this signal are missing, proper operation of the display system so as to prevent excessive current from being drawn by the output control device is implemented by a phase locked loop. Essentially, in the event of a missing horizontal sync transition, a phase locked loop which is free running will supply an artificial horizontal sync transition. While these systems work satisfactorily at low scan rates, at high scan rates such as 64 kHz inherent noise in such a phase locked loop creates noticeable visual distortion (jitter) on the picture defined by the scanning electron beam whose position is varied in accordance with the deflection yoke current. In addition, typically no protection is provided to prevent turning on the power output drive device in case the flyback voltage provided by the horizontal deflection yoke has not sufficiently decayed by the next time the power output device is scheduled to be turned on.

SUMMARY OF THE INVENTION

An object of the present invention is to provide an improved direct drive scanning CRT display system which overcomes the above mentioned deficiencies.

In one embodiment of the present invention a scanning CRT display system is provided which includes protection apparatus. The display system comprises: a deflection yoke, the current therein controlling the scanning of an electron beam which defines a desired display; scan control means coupled to said deflection yoke and including a controllable power output drive device for controlling the current in said deflection yoke; input means for providing an input control signal comprising periodic pulses to said scan control means; said scan control means including means for causing alternate increasing and decreasing of said yoke current in response to said control signal pulses, said scan control means normally responding to said received control signal periodic pulses by turning said power device on and off so that current in said power output device never exceeds a predetermined maximum current reference level; means for sensing current in said power output device, effectively comparing it to said maximum reference level, and providing an overcurrent signal in response to said sensed current exceeding said reference level; and reset means for receiving said overcurrent signal and setting said output power drive device to a predetermined on/off state in response thereto to reduce said sensed current.

Essentially, the above stated feature of the present invention relates to sensing the current through the output power drive device and turning off the output device when its through current exceeds a predetermined reference level which is greater than the normal peak current level conducted through the power output drive device. According to an additional feature of the present invention, additional protection circuitry is provided which prevents turning on the power output device in response to sensing said deflection yoke providing an output voltage in excess of a predetermined level. This additional protection circuitry effectively prevents turning on the power output device when, for some reason, the flyback voltage of the deflection yoke has not sufficiently decayed. The end result of both of the above noted protection circuits is that the destruction of the power output device is prevented by ensuring that excessive current will not pass through the power drive output device.

BRIEF DESCRIPTION OF THE DRAWINGS

For a more complete understanding of the present invention, reference should be made to the drawings in which.

DESCRIPTION OF THE PREFERRED EMBODIMENT

Figure 1A:
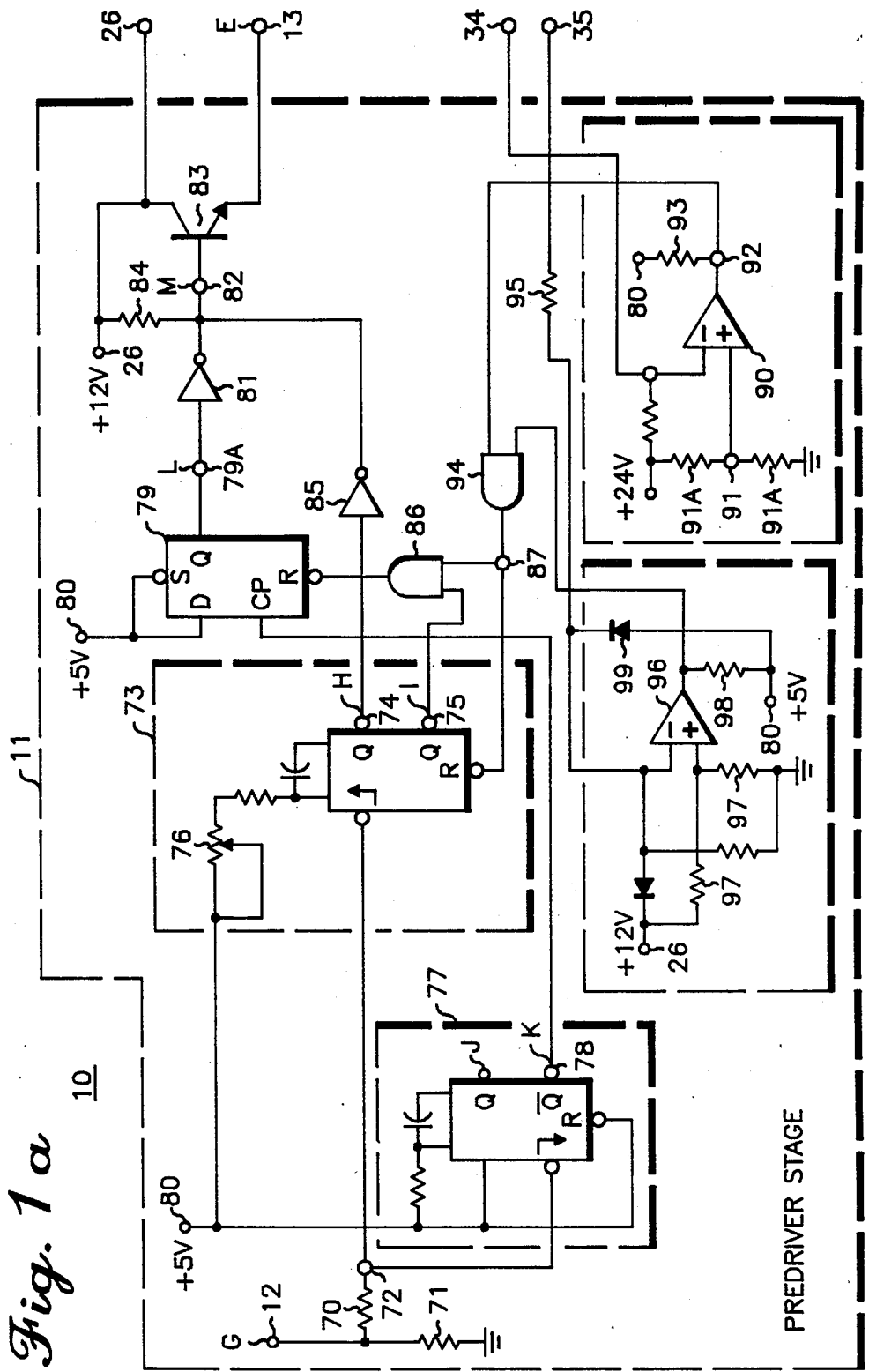
FIGS. 1a and 1b comprise a schematic diagram of a scanning CRT display system constructed in accordance with the present invention.
Figure 1B:
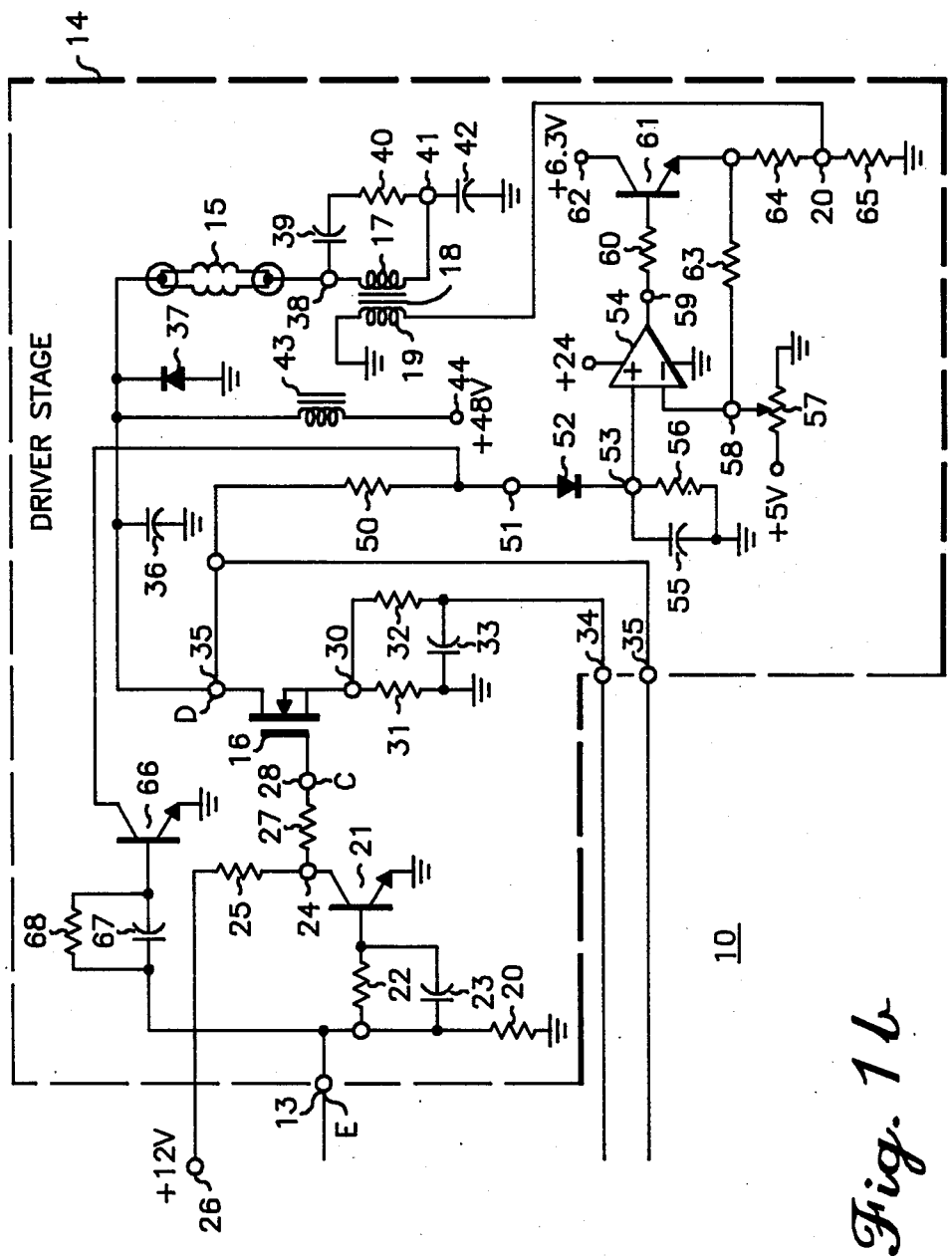

Referring to FIGS. 1a and 1b, a scanning CRT display system 10 is illustrated as a essentially comprising a predriver stage 11 (shown dashed in FIG. 1a) which receives periodic horizontal sync control signals at an input terminal 12 and processes these signals and develops output drive signals at an output terminal 13. The terminal 13 is connected as an input to a driver stage 14 (shown dashed in FIG. 1b) which receives these signals and provides for controlling, in accordance therewith, the current through a horizontal deflection yoke 15 forming part of the driver stage 14. The CRT display system 10 is intended for operation at a relatively high horizontal sweep rate such as 64 kHz. Because of this, the output device of the driver stage 14 which directly controls the current in the horizontal deflection yoke 15 is a FET (Field Effect Transistor) transistor device 16. This is because an FET device has characteristics which enable it to provide the rapid switching functions which are required for implementing a 64 kHz horizontal sweep rate as opposed to standard bipolar transistors whose internal device characteristics inhibit their use in obtaining such a sweep rate. Also FET output drive devices are desirable since they require low power drive excitation.

The horizontal deflection yoke 15 is utilized to control the scanning of an electron beam (not shown) which has its intensity modulated so as to define a desired display on a CRT (cathode ray tube) screen in accordance with conventional techniques. The current through the deflection yoke 15 essentially controls the positioning of the electron beam, and during a trace cycle of the sweeping of the beam one horizontal line of the desired display is produced. The beam is reset to a start position during a retrace cycle of the beam. A vertical deflection yoke (not shown) has its excitation varied so as to produce vertical movement of the beam such that an entire screen frame is formed by a predetermined number of horizontal traces, and this is accomplished in a conventional manner as is known in the television and CRT video display art.

Essentially, the predriver stage 11 receives the horizontal sync pulses at the terminal 12 which comprise a series of periodic pulses. These pulses are utilized to directly control the generation of the deflection yoke drive signal provided at the terminal 13. The predrive stage 11 differs from previous similar stages in that no phase locked loop is utilized to insure that pulse transitions occur at the terminal 13 within a predetermined amount of time. In prior systems a phase locked loop was typically utilized to insure the existence of these pulse transitions such that excessive current would not be conducted by the output drive device in the driver stage 14 wherein this excessive current might result in the destruction of the output drive device. The manner in which this is accomplished will be discussed subsequently.

The driver stage 14 essentially receives the drive signal at the terminal 13 and responds to it by controlling the current in the horizontal deflection yoke 15. Linearity compensation apparatus is provided for the deflection yoke 15 in the form a controllable inductance linearity coil 17 connected in series with the deflection yoke 15. The linearity coil 17 is wound on a saturable magnetic core 18, and the magnetization of the core 18 is controlled by a DC control winding 19 which is magnetically coupled to the core 18 and which receives a compensation input signal provided at a terminal 20. It should be noted that the compensation signal at terminal 20 is separate from the output of the FET device 16 which primarily controls the deflection yoke current. In general, the driver stage 14 has apparatus which effectively senses the temperature variable internal on resistance of the FET power output device 16 and provides the compensation signal at the terminal 20 in accordance therewith. In this manner the driver stage 14 provides temperature compensation for the deflection yoke 15 by varying the series inductance of the deflection yoke 15 and linearity coil 17 in accordance with the output device 16 internal on resistance wherein this resistance has an extreme temperature varying characteristic. Thus the driver stage 14 provides for variable compensation of the deflection yoke current by alterating the series inductance of the yoke 15 and linearity coil 17 in accordance with the output temperature variable characteristics of the output device 16. This will be explained in detail subsequently.

Initially, the operation of the driver stage 14 will be discussed with regard to how it responds to the control signal at the terminal 13 so as to produce desired variations in the current in the horizontal deflection yoke 15. Subsequently the operation of the predriver stage 11 will be discussed with respect to how it responds to the periodic horizontal synchronization (sync) pulses at the terminal 12 so as to produce the drive signal at the terminal 13. In discussing both the driver stage 14 and the predriver stage 11, reference will be made to the signal waveforms shown in FIGS. 2a and 2b wherein each of these waveforms has an alphabetic designation A–M. Terminals in FIGS. 1a and 1b which correspond to the circuit terminals at which these signal waveforms are produced are identified in FIGS. 1a and 1b with corresponding alphabetic designations, as well as numerical designations.

Figure 2A:
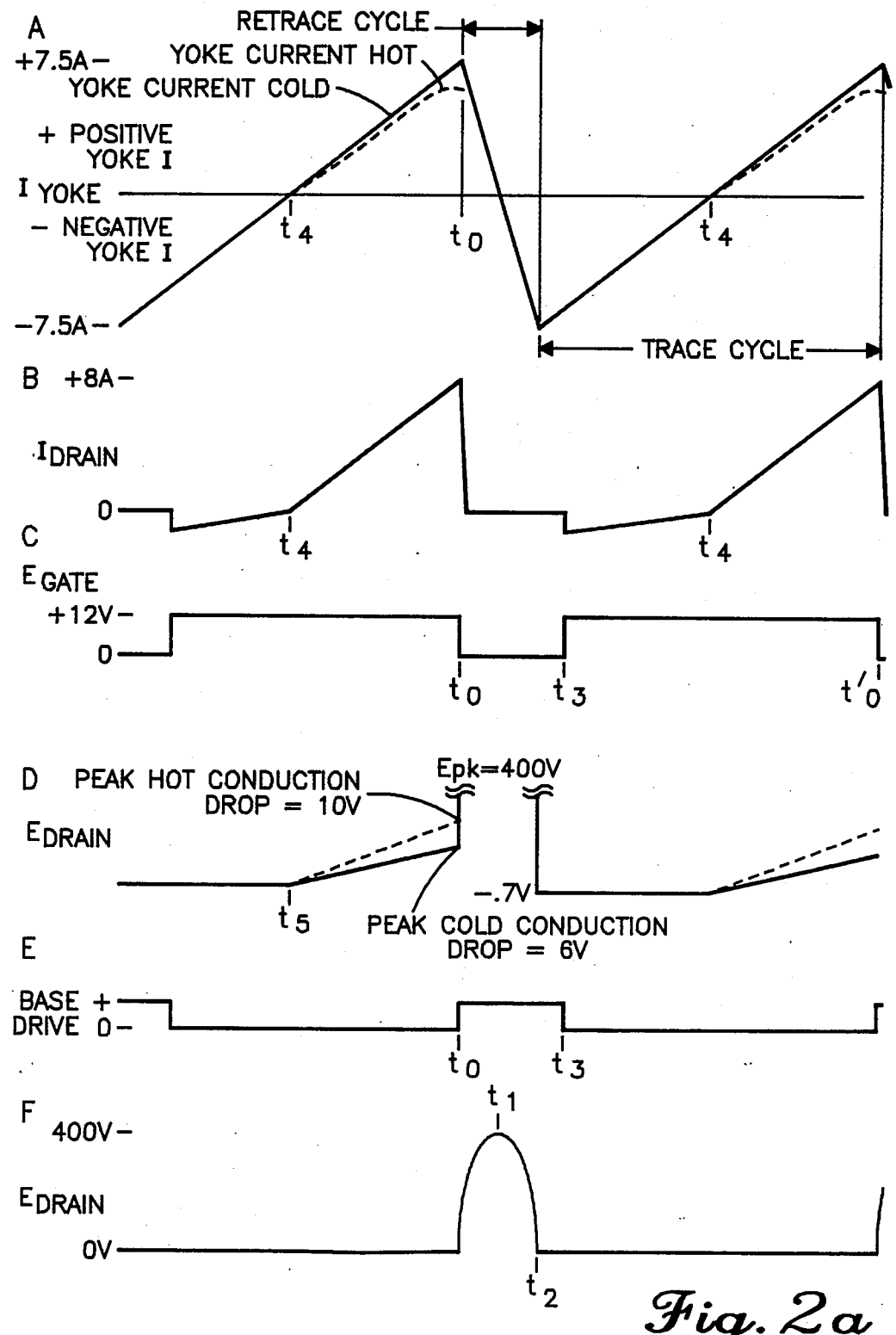
FIGS. 2a and 2b comprise a series of graphs A–M which illustrates signal waveforms A–M provided at various terminals of the display system shown in FIGS. 1a and 1b.

The drive signal at the terminal 13 corresponds to the signal waveform E shown in FIG. 2a wherein a high logic state of this waveform indicates the time at which the output drive device 16 should be turned off, and a low logic state indicates the time at which the output drive device should be turned on and conduct current. The terminal 13 is coupled to ground through a resistor 20 and is coupled to the base of a NPN transistor 21 through a resistor 22 and a capacitor 23 connected in parallel. The emitter of the transistor 21 is connected to ground and the collector of the transistor 21, corresponding to a terminal 24, is connected through a resistor 25 to a 12 volt positive supply terminal 26 and through a resistor 27 to a gate terminal 28 of the FET power output device 16. The waveform of the signal provided at the terminal 28 corresponds to the waveform C shown in FIG. 2a and merely represents the inverse of the control signal at the terminal 13.

A source terminal 30 of the FET device 16 is connected to ground through a resistor 31 connected in parallel with a series connected resistor 32 and capacitor 33 with the connection between the resistor 32 and capacitor 33 corresponding to a terminal 34 providing a sensing input signal for the predriver stage 11. A drain terminal 35 of the FET 16 is connected to ground through a large magnitude capacitor 36 and also through a power diode 37 having its anode connected to ground and its cathode connected to the terminal 35. The terminal 35 is directly connected to one end of the horizontal deflection yoke 15 which has an opposite end terminal 38 directly connected to the linearity coil 17 which connection results in providing the deflection yoke 15 in series with the linearity coil 17. A capacitor 39 and resistor 40 are connected in series across the linearity coil 17 between the terminal 38 and a terminal 41 directly connected to an end of the linearity coil 17. The terminal 41 is connected to ground through a very large magnitude capacitor 42. DC bias and operative power for the FET device 16 is provided by a choke coil 43 connected between the drain terminal 35 and a terminal 44 at which a positive 48 volt DC voltage is provided.

The above recited connections for the driver stage 14 result in the drive signal at the terminal 13 controlling the switching on and off of the FET device 16 so as to control the current in the deflection yoke 15. However, the linearity compensation for the deflection yoke 15 is accomplished in accordance with the present invention by virtue of the following additional components in the driver stage 14 which provide the compensation signal at the terminal 20.

The drain terminal 35 of the FET power output device 16 is connected through a resistor 50 to a terminal 51. A peak detecting diode 52 has its anode connected to the terminal 51 and its cathode connected to a terminal 53 which is directly connected to the noninverting input terminal of a comparator comprising a differential amplifier 54. The terminal 53 is connected to ground through a peak holding capacitor 55 connected in parallel with a return to ground resistor 56 allowing the eventual discharge of any voltage across the capacitor 55 after a predetermined amount of time, assuming no further conduction of diode 52. A selectable DC bias is provided by a potentiometer 57 at an inverting input terminal 58 of the differential amplifier 54 and an output terminal 59 of the differential amplifier 54 is connected through a resistor 60 to the base of an NPN transistor 61. The transistor 61 has its collector connected to a 6.3 volt positive supply terminal 62 and its emitter connected to the terminal 58 through a resistor 63 and connected to the terminal 20 through a resistor 64. The terminal 20 is connected to ground through a resistor 65.

The basic function of a components 50–65 is to essentially sense the peak voltage provided at the drain terminal 35 when the FET device is turned on, and to provide a compensation control signal at the terminal 20 when this peak voltage is above a threshold level set by the potentiometer 57. The linearity compensation signal at terminal 20 is essentially proportional to the difference between the peak magnitude signal provided at the terminal 53 and the threshold signal provided at the terminal 58.

In order to insure that the peak signal at terminal 53 is related to the peak drain voltage which exists only when the FET device is on, an NPN transistor 66 is provided to effectively ground the terminal 51 whenever the FET device 16 is off. This accomplished by having the collector of the transistor 66 directly connected to the terminal 51, the emitter connected to the terminal 13 through the parallel connection of a capacitor 67 and resistor 68. The components 66 through 68 insure that, at least for some predetermined time after a positive transition of the drive signal at the terminal 13, the transistor 66 will be turned on thereby grounding the signal at terminal 51 and enabling the peak detection components 52 and 55 to ignore any subsequent high drain voltage peaks which occur at this period. This is significant since during the turning off of the FET device 16 a large flyback voltage of approximately 400 volts will be produced at the terminal 35, and it is desired that the peak detection components 52 and 55 effectively ignore this voltage since they are primarily concerned with monitoring the on resistance of the FET device 16. The "on resistance" is the FET drain to source resistance during FET conduction.

The FET on resistance is monitored by sensing the drain voltage when the FET 16 is on since the peak detection signal at terminal 53 is related to the drain voltage which is related to the voltage drop produced across the FET drain and source terminals by the through current through the device 16. The preceeding result is obtained since the resistor 31 typically has a magnitude of only 0.2 ohms such that the voltage at the terminal 35 with respect to ground essentially comprises the drain to source voltage across the FET device which is a function of the on resistance of the FET device during FET conduction. As stated previously, the primary function of the driver stage 14 is to produce linearity compensation for the deflection yoke 15 in accordance with temperature variations of the on resistance of the FET power output device 16, and the manner in which this is accomplished will now be discussed in detail.

Essentially, the control signal at the terminal 13 results in switching the power FET device on and off and this results in having the FET device 16 alternately conduct and not conduct current therethrough. This effectively results in controlling the current in the deflection yoke 15 in the following manner.

For a better understanding of the present invention it should be noted that the waveform A in FIG. 2a represents the current through the horizontal deflection yoke 15 with negative values of this current indicating the conduction of deflection yoke current from the yoke terminal connected to the terminal 35 to the yoke terminal connected to the terminal 38 and positive deflection yoke current values representing the opposite flow of current. The time that yoke current is increasing represents the trace cycle, and the the more abrupt decreasing of yoke current represents the retrace cycle. It should also be noted that the waveform B in FIG. 2a represents the drain current of the FET device 16, while the waveform D represents the voltage at the drain terminal 35 of the FET device. The waveform F also represents the drain voltage at the terminal 35, but it is illustrated with a substantially different vertical scale than the waveform D so as to show the positive peak flyback voltage of 400 volts.

Essentially, just before the FET device 16 is turned off by a zero volt state being provided at the gate terminal 28, positive deflection yoke current is provided by the very large capacitor 42 supplying current through the deflection yoke 15 and through the FET device 16. Very little current flows through the choke 43 due to its relatively high AC impedance, and it should be remembered that the switching rate for the FET device 16 is contemplated as being very high (64 kHz). From the waveforms shown in FIG. 2a, it can be seen that at a time $t_0$ the FET device is turned off by applying a zero voltage (waveform C) at the gate terminal 28. At this time the drain current (waveform B) through the FET device essentially will drop to zero. Because current through the deflection yoke cannot change instantaneously, the end result will be a very large change in the voltage at the terminal 35, wherein this voltage is referred to as the flyback voltage. Thus when the FET device 16 ceases to conduct current, a large voltage is produced at the terminal 35. This voltage will subsequently decay. The end result is that the positive horizontal deflection yoke current will start to decrease at $t_0$ with the positive yoke current being coupled to ground through the capacitor 36 rather than through FET 16. The peak drain voltage obtained due to the flyback effect will substantially coincide with the time $t_1$ at which the yoke deflection current passes through zero. As the flyback voltage starts to decrease, the current flow through the horizontal deflection yoke 15 will reverse with this initial reverse current being supplied by the capacitor 36. At some later time $t_2$ the flyback voltage will have decreased to substantially zero volts, and the voltage at terminal 35 will actually reach a negative voltage of 0.7 volts thereby forward biasing the diode 37 such that it will now supply the negative deflection yoke current rather than the capacitor 36 supplying the negative deflection yoke current. This occurs at the peak of the negative deflection yoke current. The negative deflection yoke current will now decrease and subsequently at a time $t_3$ the FET device 16 will be turned on such that it will now contribute a portion of this negative deflection yoke current. At a subsequent time $t_4$ the deflection yoke current has reached zero magnitude, and at that time the FET drain current will become positive along with the deflection yoke current. Both of these conditions continue until the next turning off of the FET device at the time $t'_0$.

The above analysis of the generation of the deflection yoke current can be readily understood by realizing that for positive deflection yoke currents when the FET 16 is on the storage capacitor 42 supplies the drive voltage that results in providing a positive deflection yoke current which initially passes through the deflection yoke 15 and through the FET device 16. When the FET device 16 is turned off, the magnetic field created by the horizontal deflection yoke 15 will start to collapse, and this causes a very high voltage at the FET drain terminal 35 with this high (flyback) voltage resulting in positive deflection yoke current being conducted to ground through the capacitor 36. As this transient condition passes and the magnetic field provided by the deflection yoke 15 collapses, the voltage at the terminal 35 will reach zero volts, and then go below ground voltage to forward bias the diode 37 and produce a negative deflection yoke current resulting in recharging up the capacitor 42. Thus essentially switching the FET device 16 on and off results in providing ringing voltage and current waveforms because of the substantial inductance of the horizontal deflection yoke 15. The end result is the ramp shaped deflection yoke current waveform A shown in FIG. 2a.

A primary reason that FET devices have not been utilized previously for controlling horizontal deflection yoke current is that the on resistance of these devices has a substantial temperature dependence and this results in undesired variations in the deflection yoke current as a function of temperature. This can best be illustrated by referring to the drain voltage waveform D shown in FIG. 2a wherein the solid ramp voltage shown is produced at a cold operating temperature of the FET 16, and the dashed ramp voltage is produced for high temperature operation of the FET device. The corresponding effect on deflection yoke current is illustrated in graph A of FIG. 2a with the dashed line illustrating the uncompensated effect on the deflection yoke current that would occur due to the increase in FET on resistance at high temperatures. The present display system 10 has recognized this effect and provides compensation for this temperature variation output characteristic of FET device 16. The result is a substantially constant rate of increase of deflection yoke current during the trace cycle, and a constant peak magnitude of the deflection yoke current. This is shown by the solid waveform A in FIG. 2a, and is accomplished in the following manner.

Essentially, the maximum peak of the drain voltage signal at the terminal 35, when the FET devices are on, is sensed by a peak detector circuit comprising the diode 52 and capacitor 55. The repetition frequency of the turning on and off the FET device is sufficiently rapid such that this peak voltage is maintained at the terminal 53 in accordance with the peak voltage signal at the terminal 35 which occurs when the FET is on. Thus the signal at the terminal 53 has a magnitude related to the on resistance of the FET device 16. This is because the voltage at the drain terminal 35, when the FET is on, is directly related to the product of the drain current and on resistance of the FET device 16 since the magnitude of the resistor 31 is very small. The differential amplifier 54 responds to this peak magnitude by providing a difference signal at its output terminal 59 which is effectively fed into an emitter follower stage comprising the transistor 61. The result of this is the providing of the linearity compensation control signal at the terminal 20. The magnitude of the signal at terminal 20 determines the amount of control magnetization provided by the control winding 19. This in turn controls the saturation of the core 18 which in turn controls the effective inductance of the linearity compensating coil 17. In this manner, as the on resistance of the FET device 16 increases due to increasing temperature, the normally expected decrease in the peak magnitude of the positive deflection yoke current is offset by the control winding 19 decreasing the inductance of the linearity coil 17 so as to maintain a substantially constant peak magnitude of the positive deflection yoke current. The end result is that despite substantial variations in the on resistance of the FET device 16 as a function of temperature, a constant linear increase and a constant positive peak yoke current for the horizontal deflection yoke 15 is maintained over temperature during the trace cycle. This insures proper operation of the horizontal deflection yoke driver stage 14 over a substantial temperature range and thereby enables the use of a power FET device to control the horizontal deflection yoke current.

It should be noted that while the present configuration for the driver stage 14 illustrates sensing the output temperature variable characteristic of the power drive device 16 and providing a compensation signal at the terminal 20 in accordance therewith, other types of linearity compensation for the horizontal deflection yoke could be achieved by providing various other compensation signals at the terminal 20. These other compensation signals could be a function of other variables wherein a key feature would be controlling the inductance of the linearity coil to obtain linear compensation of the horizontal deflection yoke current. This feature is contrasted with prior techniques of utilizing a fixed magnetic core bias for the linearity coil wherein no adjustment of the magnetic bias in accordance with an externally provided compensation control signal, separate from the FET output signal at terminal 35, was accomplished.

The operation of the predriver stage 11 of the scanning CRT display system 10 will now be discussed in detail. It should be noted that the signal waveforms previously discussed with respect to the driver stage 14 are still applicable since the function of the predriver stage 11 is to react to periodic horizontal synchronization input signals at the terminal 12 and provide the drive signals present at the terminal 13, the waveforms of which are shown in graph E in FIG. 2a.

Figure 2B:
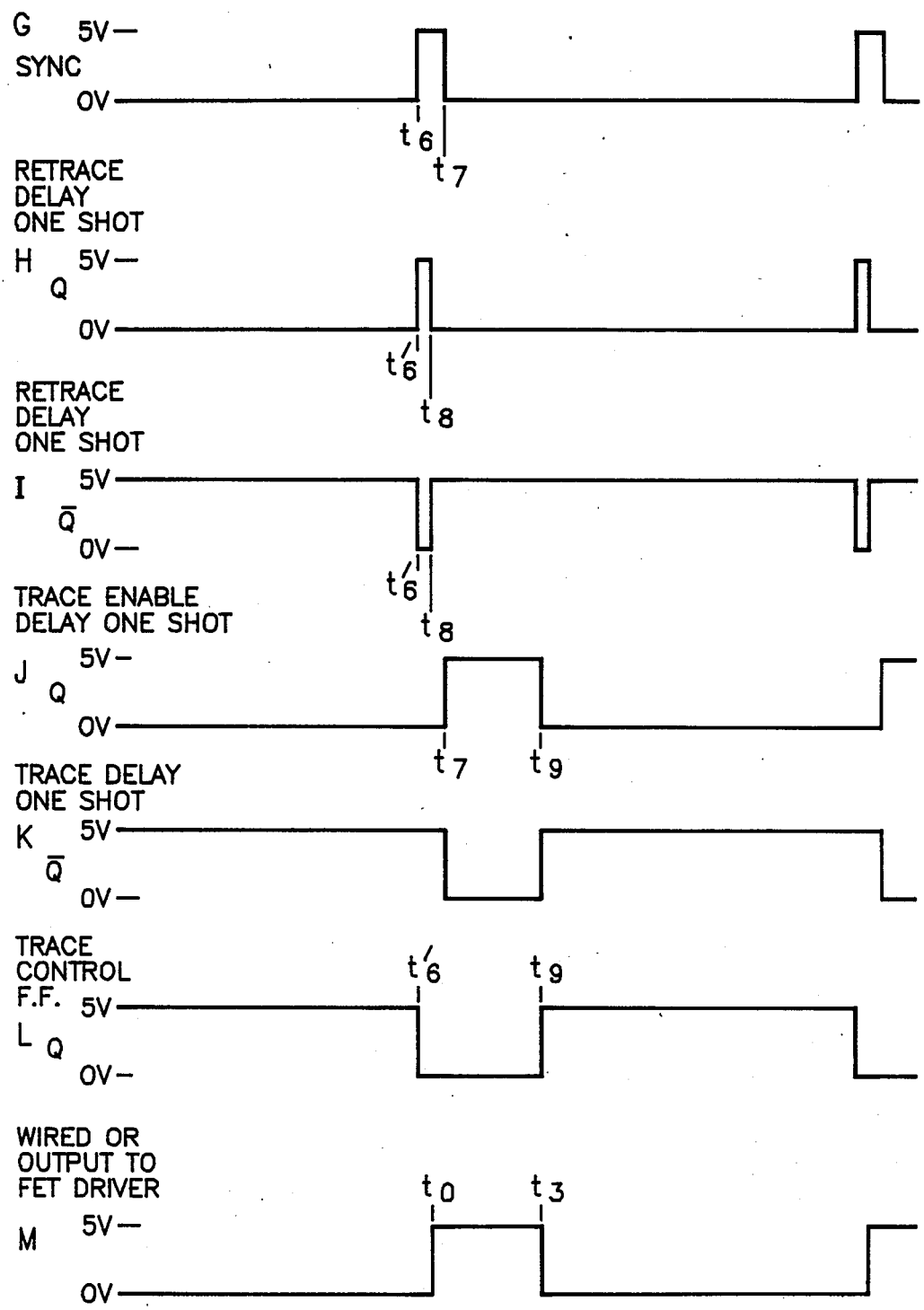

At the terminal 12 of the predriver stage 11, periodic horizontal synchronization input pulses are provided, the waveforms of which are illustrated in graph G in FIG. 2b. The periodic horizontal sync pulses at terminal 12 are either supplied by television sync separator circuits, if the display system 10 is part of a television set, or they may be externally supplied if the system 10 is part of a display monitor. The rising edges of the horizontal sync pulses at the terminal G occur at a time $t_6$ which is just prior to the time $t_0$. The falling edges of the pulses of the signal at the terminal 12 occur at a time $t_7$. Essentially a retrace of the horizontal deflection yoke will be implemented in accordance which each rising edge transition of the signal at terminal 12 which occurs at the times $t_6$, and the occurrence of a falling transition at times $t_7$ will result in enabling the next sequential horizontal trace cycle.

In known prior systems it was necessary to include additional circuitry such as a phase locked loop to ensure that if a rising or falling edge transition did not occur some substitute transition would be provided such that the yoke power drive device would not have its power dissipation limits exceeded which might result in the destruction of this device. As can be seen by the waveforms shown in FIG. 2a, if a retrace was not provided in response to the existence of a rising edge transition at the time $t_6$, the deflection yoke current and drain current would continue to increase resulting in the FET device exceeding its power dissipation capabilities and thereby resulting in the probable destruction of this device. Of course if more rugged, and therefore much more expensive, output devices were utilized then this might not present a problem. However, in order to utilize solid state transistor devices, rather than expensive tube devices, previous circuits required the use of a phase locked loop circuit which came into play whenever the horizontal input sync signal was lost or failed to produce a required transition. While these circuits perform satisfactorily at low frequencies, we have noticed that objectionable video characteristics are produced at high horizontal sweep frequencies due to objectionable noise inherent in the phase locked loop. Thus the conventional solution to ensure the non burn out of the power output device did not provide a satisfactory solution at high CRT scan rates. This problem was overcome by the display system 10 implementing the predriver stage 11 in accordance with the following description.

Essentially the terminal 12 is coupled through a divider network comprising resistors 70 and 71 to an input terminal 72. The input terminal 72 is connected as an input to two different one shot monostable multivibrators. A first one of these monostable multivibrators 73 (shown dashed) responds to a rising edge of the signal at the terminal 72 (which directly corresponds to the rising edge of the signal at the terminal 12 shown in FIG. 2b as waveform G) and provides an output signal pulse at a terminal 74 shown as signal waveform H in FIG. 2b. An inverse of the signal at the terminal 74 is provided at an output terminal 75 of the monostable 73 and this inverse signal is shown as waveform I in FIG. 2b. The leading edge of the pulse provided at the terminal 74 in response to the rising edge transition at the time $t_6$ of the signal at terminal 72 commences a very short time after the time $t_6$ and is therefore designated as $t'_6$. The duration of this pulse is selectable by virtue of a variable resistor 76 in the monostable 73 with the resistor 76 adjusted so that the pulses for the signals H and I will terminate at times $t_8$ prior to the times $t_7$.

Essentially, the signal at the terminal 74 represents a retrace signal which is utilized to cause a transition in the drive signal at the terminal 13 so as to turn the FET device 16 off and thereby implement a retrace of the electron beam controlled by the horizontal deflection yoke 15. The turning off of the FET device 16, which corresponds to the rising edge transition of the signal at the terminal 13 (waveform E in FIG. 2a), occurs at the time $t_0$ which corresponds to the time $t_8$ which is the falling edge transition of the pulses at the terminal 74 shown in waveform H in FIG. 2b. This will be explained subsequently.

A monostable multivibrator one shot circuit 77 (shown dashed) also receives the input signal provided at the terminal 72, in addition to the monostable circuit 73, but responds to the negative transition of the signal at the terminal 72. The end result is that at an output terminal 78 of the monostable circuit 77 a negative pulse is produced substantially at the time $t_7$, which negative pulse exists for a predetermined time duration until a subsequent time $t_9$. Essentially, the function of the monostable 77 is to respond to negative edge transitions of the horizontal sync signal at the terminal 12 and produce a latched output corresponding to the signal waveform at the terminal 78 which corresponds to signal waveform K in FIG. 2b.

The signal waveform K essentially corresponds to a trace enable signal since this signal is utilized for toggling a trace control flip-flop 79 having a clock pulse input terminal (CP) directly connected to the terminal 78. A data terminal D of the flip-flop 79 is connected to a positive 5 volt supply voltage terminal 80 along with a set terminal S. A Q output terminal 79A of the flip-flop 79 is coupled through an inverter 81 to a terminal 82 directly connected to the base of an NPN transistor 83. The collector of the NPN transistor 83 is directly connected to the positive supply voltage terminal 26 and the emitter of the NPN transistor is connected to the terminal 13 with base bias for the transitor provided by a resistor 84 connected between the terminals 26 and 82. The pulse output signal at the terminal 74 provided by the monostable 73 is also coupled through an inverter stage 85 to the terminal 82 and this configuration essentially provides a wired OR gate since an output from either the flip-flop 79 or the monostable 73 results in controlling the signal at the terminal 82. Of course the drive signals provided at the terminal 13 are a direct function of the signals provided at the wired OR terminal 82, and these signals essentially comprise the effective substraction of the signal provided by the Q terminal 79A of the flip-flop 79 and the signal provided at terminal 74 of the monostable 73.

The inverted output terminal 75 of the monostable 73 is connected as an input into an AND gate 86 which has its output connected to a reset terminal of the flip-flop 79. Another input to the AND gate 86 is provided by an input terminal 87 at which it is expected that a high logic state will normally be provided. The signal at the terminal 87 can generally be considered a protect signal since only if this signal is low will the normal operation of the monostables 73 and 77 and flip-flop 79 be interferred with. In the event of a high signal at the terminal 87 indicating that normal operation of the predriver stage 11 and driver stage 14 is proceeding, the negative pulses provided at the terminal 75 in response to the rising transition of the horizontal sync input signal at the terminal 12 will result in resetting the trace control flip-flop 79 at the time $t'_6$ due to gate 86 passing this negative reset pulse. The output state of the trace control flip-flop 79 will remain in this reset state until the next appearance of a clock pulse rising transition which will occur at the time $t_9$ due to the signal at the terminal 78. Thus essentially the signal at the Q terminal 79A of the trace control flip-flop 79 has a falling edge produced in response to the rising edge of the horizontal sync signal at the terminal 12, and a rising edge produced in response to the falling edge of the horizontal sync signal at the terminal 12, but wherein the duration between the times $t'_6$ and $t_9$ is controlled by the monostables 73 and 77. However, the output of the trace control flip-flop is not utilized directly to provide the control signal at the terminal 13 since the OR configuration of the inverters 81 and 85 results in effectively inverting the signal at the Q terminal 79A of flip-flop 79 while also substracting the signal at the terminal 74 shown as waveform H in FIG. 2b. Thus the signal at the terminal 82 corresponds to waveform M in FIG. 2b. This signal corresponds to the waveform E at terminal 13 since transistor 83 does not provide a phase inversion.

The result of the structure described above for the predriver stage 11 results in providing drive control signals at the terminal 13 directly in response to the occurrence of the rising and falling edges of the horizontal sync signals provided at the terminal 12. As stated previously, prior art circuits required the use of a phase locked loop circuit to ensure that in case a rising or falling edge transition was missing from the horizontal sync signal an excessive amount of current was not generated which would result in destruction of one or more components in the driver stage. However, the use of such a phase locked loop is not feasible in high frequency scan circuits since the inherent noise of the phase locked loop circuit results in unacceptable picture jitter, especially when column data is to be displayed on a scanning CRT. Thus to overcome this problem, additional circuitry has been added to the above recited components and this additional circuitry will now be discussed.

Essentially, the present invention provides for turning off the FET power output device in response to sensing that the current through this device has reached an unacceptable level. This is accomplished by noting that at the terminal 34 in the driver stage 14 a voltage is produced which is related to the magnitude of the FET source current multiplied by the magnitude of the fixed resistor 31. Thus the voltage at the terminal 34 is directly related to the through current in the FET device 16. The terminal 34 is connected to the negative input of a comparator device 90, the positive input of which is provided at a terminal 91 by a voltage divider two 91A. The output of the comparator 90 provided at a terminal 92 connected to the positive 5 volt terminal 80 through a resistor 93. The terminal 92 is also connected as an input to an AND gate 94 whose output is directly connected to the terminal 87. The effect of this connection is that in the event that an excessive FET through current is sensed by the comparator 90, a low signal is provided at the terminal 92 which results in a low signal at the terminal 87. This means that when such an excessive source current is sensed a low signal will be provided at the reset terminal of the trace control flip-flop 79 due to the action of the AND gate 85. In response to this low reset signal, the trace control flip-flop 79, at its Q terminal 79A, will provide a low state, and this in turn, via the inverter 81, will terminate the FET gate excitation and thereby terminate any further drain current. In addition, the low signal at the terminal 87 is also coupled to a reset terminal R of the monostable 73 ensuring that this device will not provide an output, via the inverter 85, which might try to turn on the FET at this time.

Basically, the voltage divider 91A provides a maximum current reference level at terminal 91. This reference level corresponds to a FET through current above the peak through current normally produced. When FET through current exceeds this reference level the comparator 90 provides an overcurrent output signal which resets (turns off) the FET by resetting the flip flop 79.

In addition to the operation of the components 90-94 providing an overcurrent protection circuit, additional circuitry is provided which prevents turning on the field effect transistor if the flyback voltage produced by the horizontal deflection yoke 15 and flyback diode 37 is not sufficiently decayed prior to the occurrence of the time t9, at which time the field effect transistor 16 would normally be turned on. This is accomplished in the following manner.

The drain terminal 35 in the driver stage 14 is coupled through a resistor 95 to a negative input terminal of a comparator 96 which receives a reference voltage at its positive input terminal by virtue of a voltage divider two resistor 97 connected between the terminal 26 and ground. The output of the comparator 96 is directly connected as an input to the AND gate 94 and is also coupled through a resistor 98 to the 5 volt positive supply terminal 80. A diode 99 is provided between the terminal 80 and the negative input of the comparator 96 with the anode of the diode directly connected to the terminal 80. The function of the components 95-98 is as follows:

Whenever the voltage at the drain terminal 35 of the FET device is above a predetermined voltage level set by the resistor divider 97, a low logic state will be provided by the comparator 96 as one of the inputs to the AND gate 94. This will result in effectively disabling the monostable one shot 73 and the trace control flip-flop 79. The result of this is that, as was the case for an overcurrent condition, the FET power output device 16 cannot be turned on at this time. This is a desirable condition because if the flyback voltage at the drain terminal of the FET has not sufficiently decayed, turning on the FET device would result in an excessively large current surge through the FET device and the potential destruction of the device. Thus essentially the two inputs to the AND gate 94 combine to form a protection signal at the terminal 87. This signal results in preventing turning the FET device on when to do so would cause a excessive FET current. In addition, the protect signal at the terminal 87 results in turning off the FET device so that any previous conduction will cease and therefore in the event of a missing transition in the periodic horizontal sync input signal at the terminal 12 excessive FET current will not be provided.

While we have shown and described a specific embodiment of the present invention, further modifications and improvements will occur to those skilled in the art. For example, obviously different configurations for the monostable multivibrators 73 and 77 could be used, other than the configurations shown in FIG. 1a which represent preferred conventional integrated circuits which implement the discussed functions of the monostables. All such modifications which retain the basic underlying principles disclosed and claimed herein are within the scope of this invention.

We claim:
1. A scanning CRT display system comprising:
a deflection yoke, the current therein controlling the scanning of an electron beam which defines a desired display;
scan control means coupled to said deflection yoke and including a controllable power output drive device for controlling the current in said deflection yoke;
input means for providing an input control signal comprising periodic pulses to said scan control means;
said scan control means including means for causing alternate increasing and decreasing of said yoke current in response to said control signal pulses, said scan control means normally responding to said received control signal periodic pulses by turning said power output drive device on and off so that current in said power output drive device never exceeds a predetermined maximum current reference level;

means for sensing current in said power output drive device, effectively comparing it to said maximum current reference level, and providing an overcurrent signal in response to said sensed current exceeding said maximum current reference level; and reset means for receiving said overcurrent signal and setting said output power drive device to a predetermined on/off state in response thereto to reduce said sensed current.

2. A scanning CRT display system according to claim 1 which includes means for sensing voltage currently being produced by said deflection yoke in response to a predetermined on/off state of said power output drive device and, in response to said sensed voltage being in excess of a predetermined level, for preventing said input control signal from switching said power output drive device to an opposite predetermined on/off state.

3. A scanning CRT display system according to claim 1 wherein said scan control means includes means for increasing yoke current in response to a predetermined polarity transition of said input control signal and decreasing yoke current in response to an opposite polarity transition of said input control signal.

4. A scanning CRT display system according to claim 1 wherein said scan control means includes means for switching said power output drive device to a predetermined on/off state to decrease yoke current in response to an occurrence of a predetermined condition of said input control signal, and wherein said reset means includes means for also switching said power output device to the same predetermined on/off state in response to said overcurrent signal provided by said means for sensing current in said power output drive device.

5. A scanning CRT display system according to claim 4 wherein said scan control means includes means for increasing yoke current in response to a predetermined polarity transition of said input control signal and decreasing yoke current in response to an opposite polarity transition of said input control signal, and wherein said scan control means includes at least one monostable circuit means for responding to control signal transitions of a predetermined polarity and providing, in response thereto, an output pulse having a known duration, said scan control means including means for implementing increasing/decreasing of said yoke current in response to said transitions of said input control signal only after said output pulse duration.

6. A scanning CRT display system according to claim 5 wherein said scan control means includes two separate monostable circuits, each responding to different polarity transitions of said input control signal, outputs of both of said monostables determining said deflection yoke current.

7. A scanning CRT display system according to claim 1 wherein said scan control means includes a scan control flip flop means, the output of said flip flop determining said deflection yoke current, said flip flop being normally alternately set and reset in response to said input control signal, but said reset means, in response to said overcurrent signal, resetting said flip flop to a predetermined state.

8. A scanning CRT display system according to claim 1 which includes means for sensing a flyback transient voltage produced by said deflection yoke in response to said scan control means switching said power output drive device to decrease current in said deflection yoke, said means for sensing flyback transient voltage also preventing said input control signal from switching said power output drive device to a predetermined on/off state to increase deflection yoke current in response to said flyback transient voltage being in excess of a predetermined level.

* * * * *